(12) United States Patent
Donovan et al.

(10) Patent No.: US 6,792,410 B1
(45) Date of Patent: Sep. 14, 2004

(54) AUTOMATED CLAIM REPRICING SYSTEM

(75) Inventors: Edward Joseph Donovan, Naperville, IL (US); Wendy Marie Towner, Bolingbrook, IL (US); Christian Berthaud, Hinsdale, IL (US)

(73) Assignee: HFN, Inc., Oak Brook, IL (US)

( * ) Notice: Subject to any disclaimer, the term of this patent is extended or adjusted under 35 U.S.C. 154(b) by 0 days.

(21) Appl. No.: 09/307,136

(22) Filed: May 7, 1999

(51) Int. Cl.$^7$ .............................................. G06F 17/60
(52) U.S. Cl. ......................................................... 705/4
(58) Field of Search .............................. 705/1, 2, 3, 4, 705/30; 709/200, 201, 202

(56) References Cited

U.S. PATENT DOCUMENTS

| | | | | |
|---|---|---|---|---|
| 5,950,169 | A | * | 9/1999 | Borghesi et al. ................ 705/4 |
| 6,125,354 | A | * | 9/2000 | Macfarlane et al. ........... 705/30 |
| 6,163,770 | A | * | 12/2000 | Gamble et al. ................. 705/4 |
| 6,343,310 | B1 | * | 1/2002 | DiRienzo .................... 709/200 |

OTHER PUBLICATIONS

Article entitled "New Software for Medical Auto Claims", published by Best's Review, Nov. 1998, obtained from Proquest.*

Article entitled "Life and Health", published by Insurance Advocate, Oct. 3, 1998, obtained from Proquest.*

Article entitled "CSC and Healtheon form virtual healthcare network alliance" obtained from Proquest.*

Excerpt from "Medcial Expense Insurance", published by HIAA, 1997, obtained from technology center library.*

* cited by examiner

*Primary Examiner*—Sam Rimell
(74) *Attorney, Agent, or Firm*—McAndrews, Held & Malloy, Ltd.

(57) ABSTRACT

The present claim repricing system generally includes a processor and a program and data memory coupled to the processor. The memory stores the requisite database tables, as well as program instructions for repricing several different types of claims, including physician, inpatient, and outpatient claims. The claim repricing system includes instructions for determining availability of insurance plan coverage to the patient based on an effective date of the employer insurance plan, as well as determining the availability of the physician or provider based on an effective provider date. The claim repricing system further handles specialty codes and exceptions. For example, the claim repricing system includes instructions for determining the presence of anesthesia specialty codes, and for determining the correct number of anesthesia units and an anesthesia repricing indicator. The anesthesia repricing indicator may be a percentage discount, for example, or a rate. Furthermore, the claim repricing system may operate in a batch processing mode to quickly, accurately, and reliable reprice large amounts of claims.

33 Claims, 10 Drawing Sheets

AUTOMATED CLAIM REPRICING SYSTEM

BACKGROUND OF THE INVENTION

The present invention relates to a claim repricing system for processing insurance claims. In particular, the present invention relates to an automated system operative locally or remotely for repricing claims individually or in batch.

The insurance industry has long faced the challenges of quickly, accurately, and efficiently processing claims. The claims may arise from many sources, but often originate with health care service providers that, for example, supply hospital inpatient, hospital outpatient, and worker's compensation medical services. In addition, the tremendous growth in recent years of health organizations, such as Preferred Provider Organizations (PPOs), has contributed significantly to the number and type of claims insurers must process.

In a PPO, for example, claims may arise from any member of any group of health care professionals or hospitals that have contracted with an employer or insurance company to provide medical care to a specified group of patients. The participating health care providers typically exchange discounted services for an increased volume of patients from the group. One advantage of PPOs is that they are often very large, thereby providing a wide choice of physicians, hospitals and other health care providers. In addition, PPO members usually do not need prior authorization to see a specialist, and have some level of coverage regardless of where they go for care.

Regardless of where and how insured patients incur medical expenses and submit claims, the fact remains that the claims must be processed before being paid. The processed claim gives rise to a "repriced" claim amount. The repriced claim amount is generally lower than the original claim amount, and represents the money to be paid to the provider for rendering the services. Inaccurate claim repricing has a significant detrimental impact on insurer profitability, not only as an immediate consequence of incorrect claim payment, but also due to the need to engage in ongoing repriced claim review (and re-repricing when mistakes are found).

In the past, however, repricing claims has been a difficult, error prone, and time consuming burden, in part due to the fantastically complicated set of rules underlying claim repricing. Even a skilled claim repricer may only be able to reprice 125 claims per week. Due to the time consuming repricing process and the frequent need to employ extra help, Third Party Administrators (TPAs) are often hired to reprice claims. However, TPAs are generally not well versed in the repricing process, and often reprice 40% or more of claims incorrectly. The expense of exchanging claims, fee schedule records, and provider records with the TPAs further detracts from any benefit the TPAs may provide.

Some of the difficulty surrounding repricing originates in the vast number of services that a provider may render, the specific handling and processing exceptions required for the services, and the variation in the forms used to submit claims. For example, PPO and EPO claims may be submitted on a Health Care Financing Administration (HCFA) 1500 form, while hospital inpatient and outpatient services may be submitted on a UB-92 form. Superbills, which conform to no standard specification, may also detail services to be repriced.

The initial repricing steps require the claims to be categorized correctly. Thus, after a new claim is received, opened, sorted, and stamped, a repricer determines, for example, whether the claim is a workers' compensation claim, a hospital claim, or a physician claim. Hospital claims must be further categorized into inpatient or outpatient claims. Inpatient claims are further distinguished, among other things, based on whether a Diagnostic Related Group (DRG) code applies.

In repricing a physician claim on a HCFA 1500 form, the repricer must first identify the physician, typically according to tax id. Each physician may have multiple tax ids generally, but not necessarily, corresponding to differing practice locations for that physician. The repricer must then select the correct fee schedule or straight discount amount from among several choices. Once the correct fee schedule is found, each service on the HCFA 1500 form must be repriced.

Each service is classified according to a Current Procedural Terminology (CPT) code that identifies the medical service or procedure. The purpose of a CPT code is to provide a uniform language that accurately describes medical, surgical, and diagnostic services. There are, however, over 14,000 CPT codes that may need to be checked against the fee schedule for repricing. Furthermore, once the repricer determines the repriced amount from the fee schedule, the repricer must replace the initial amount with the repriced amount and repeat the process for every CPT code. After the repricer has processed each service, the repricer is also responsible for maintaining a record of the repriced claim and generating a repriced claim form for submission to an insurer for payment.

Further complicating the repricing process is the fact that special exceptions may apply. For example, anesthesia has its own special CPT codes, over 50 code modifiers, and 6 secondary modifiers. Anesthesia thus invokes a separate set of repricing formulae that increases the complexity of the already complicated repricing process.

In addition, of course, to repricing a physician claim on a HCFA 1500 form, the repricer must also be able to handle hospital claims on a UB-92 form. Repricing a hospital claim is as complicated, if not more complicated than repricing a physician claim. For example, and as noted above, hospital claims need to be classified as inpatient or outpatient claims, and scoured for any number of special codes and exceptions.

Inpatient claims must be further classified as DRG or non-DRG claims. Multiple DRGs typically exist, requiring the repricer to correctly choose the applicable DRG. Likewise, for claims that use straight percentage repricing, many different percentages are possible and require the repricer to intelligently select the correct percentage.

Outpatient claims are repriced line item by line item, while Inpatient claims are repriced by the total value of services. Outpatient claims are further subject to numerous repricing exceptions for specific services including, for example, transplants. Ambulatory Surgical Codes (ASCs) form another type of exception. The ASCs generally fall into at least eight groups each requiring a predetermined flat dollar repricing determination.

The complications noted above are only a few of the many issues that a repricer must address while working with a claim. In the past, the burden of claim repricing has meant that even an experienced repricer could only process 125 claims per week. Today, with hundreds of thousands of claims requiring processing annually, the repricing techniques of the past are no longer suitable.

A need has long existed in the industry for an improved method of repricing insurance claims.

BRIEF SUMMARY OF THE INVENTION

It is an object of the present invention to provide a claim repricing system.

Another object of the present invention is to provide an automated, accurate, and rapidly operating claim repricing system.

Yet another object of the present invention is to compile a database of repriced claims for future analysis and processing.

It is another object of the present invention to provide a claim repricing system that allows local and remote repricing of claims.

Still another object of the present invention is to reprice claims quickly and efficiently in batch.

A further object of the present invention is to provide a claim repricing system that is able to reprice a wide variety of claims, including physician, hospital inpatient, hospital outpatient, and other types of claims.

The present claim processing system may be implemented on a general purpose computer. The claim repricing system generally includes a processor and a program and data memory coupled to the processor. The memory stores the requisite database tables, as well as program instructions for repricing several different types of claims, including physician, inpatient, and outpatient claims.

For example, for physician claims, the instructions may store service charges identified by CPT codes, identify a physician from a database of physicians according to a physician ID, and identify a patient from a database of patients. The instructions may then determine an employer insurance plan providing coverage for the patient based on an insured-by ID associated with the patient and a repricing indicator based on an affiliation of the physician as well as the employer insurance plan. Additional instructions then reprice the service charges according to the repricing indicator to generate repriced service charges.

As an example, the repricing indicator may be a fee schedule setting forth individual repricing dollar amounts associated with CPT codes. Alternatively, the repricing indicator may be a straight percentage discount. The claim repricing system further includes instructions for determining availability of insurance plan coverage to the patient based on an effective date of the employer insurance plan, as well as determining the availability of the physician or provider based on an effective provider date.

The claim repricing system handles specialty codes and exceptions. Thus, for example, the claim repricing system includes instructions for determining the presence of an anesthesia specialty code, and for determining the correct number of anesthesia units and an anesthesia repricing indicator. The anesthesia repricing indicator may be a percentage discount, for example, or a rate.

As noted above, the present claim repricing system is not limited to repricing physician claims. Rather, as explained in more detail below, the claim repricing system may also repricing inpatient and outpatient claims. Furthermore, the claim repricing system may operate in a batch processing mode to quickly, accurately, and reliable reprice large amounts of claims.

DETAILED DESCRIPTION OF THE INVENTION

Figure 1:
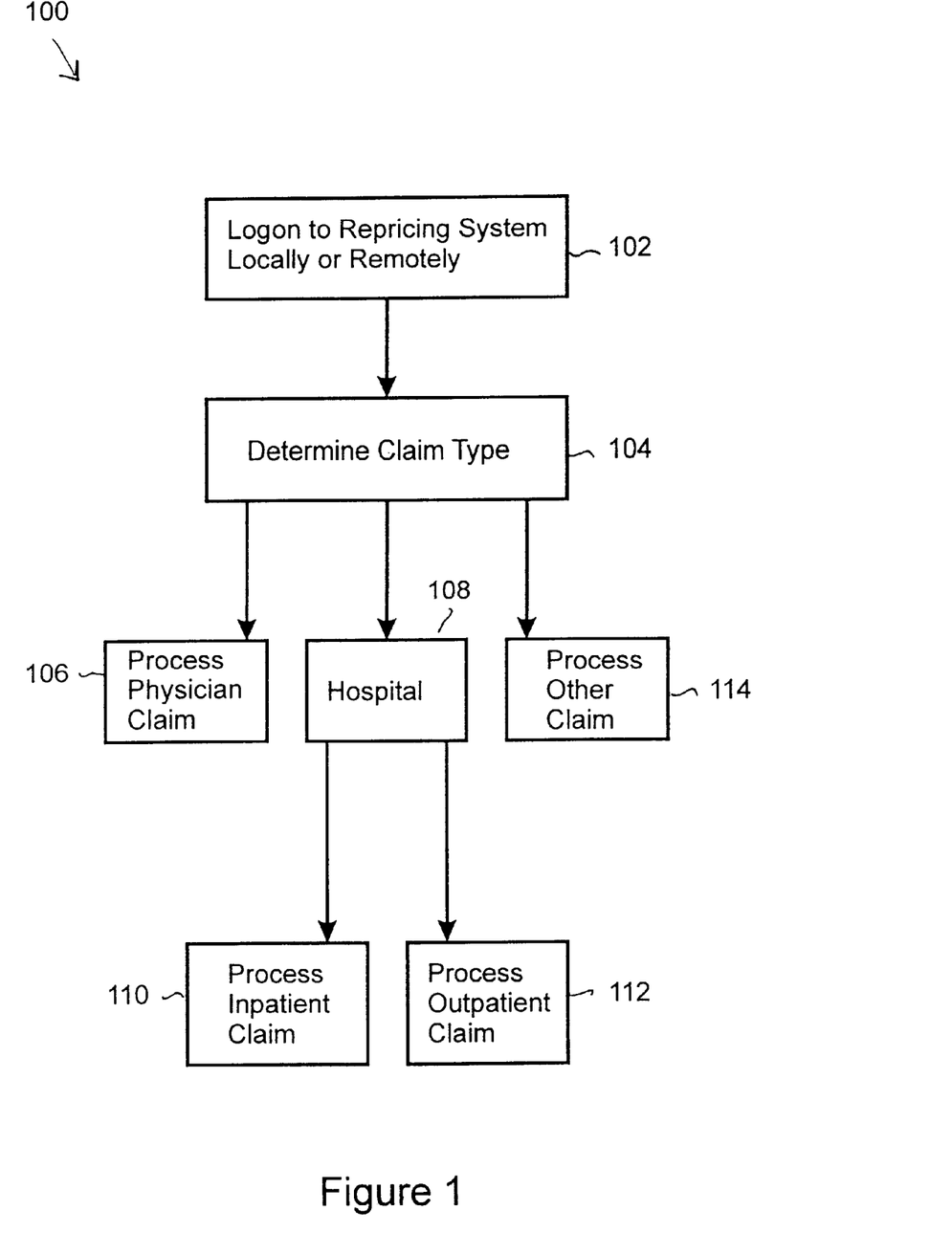
FIG. 1 illustrates a very high level block diagram of processing steps of a claim repricing system.

Turning now to FIG. 1, that figure illustrates a high level block diagram 100 of the steps executed by a claim repricing system typically implemented, as described below, on a general purpose computer system. At the logon step 102, a user establishes a secure connection with the claim repricing system. The logon process may be accomplished, for example, using a password, password sequence, or any other suitable security check.

For local access, the logon process may be executed directly at the claim repricing system or at a terminal connected to the claim repricing system via a local area network, for example. Alternatively, the user may initiate the logon process remotely. In a remote logon, the user may access the claim repricing system, for example, over a direct dial modem line, wide area network, or across the Internet using a web browser. Preferably both local and remote access operate through Microsoft Internet Explorer™ and active server pages and hypertext markup language pages. An exemplary set of ASP and HTML code for web browser access (and interfacing with the claims repricing system in general) is provided in the microfiche appendix.

Returning to FIG. 1, at the determination step 104, the claim repricing system determines which type of claim to reprice. The claims may be a physician claim, a hospital claim, or any other type of claim recognized by the claim repricing system.

The claim repricing system processes physician claims, if appropriate, at step 106. With regard to a hospital claim, the claim repricing system preferably determines, at step 108, whether the claim is an inpatient claim or an outpatient claim. An inpatient claim is processed at step 110, and an outpatient claim is processed at step 112. Any other recognized claims may be processed, for example, at the processing step 114. The physician and the hospital claim processing steps will be described in more detail below.

Generally, a "repriced claim" results when the claim repricing system completes each claim. The claim repricing system typically prints the repriced claim for submission to a payor and stores the repriced claim in a database for future reference, generation of statistics, and the like.

The logic underlying the claim repricing system (described in detail below) may be used by human repricers or by an automated batch repricing system. The batch process may connect with the claim repricing system and quickly reprice numerous claims by supplying the claim repricing system with the appropriate data. The automated batch process may, to a great extent, eliminate human intervention during the claim repricing process.

Figure 2A:
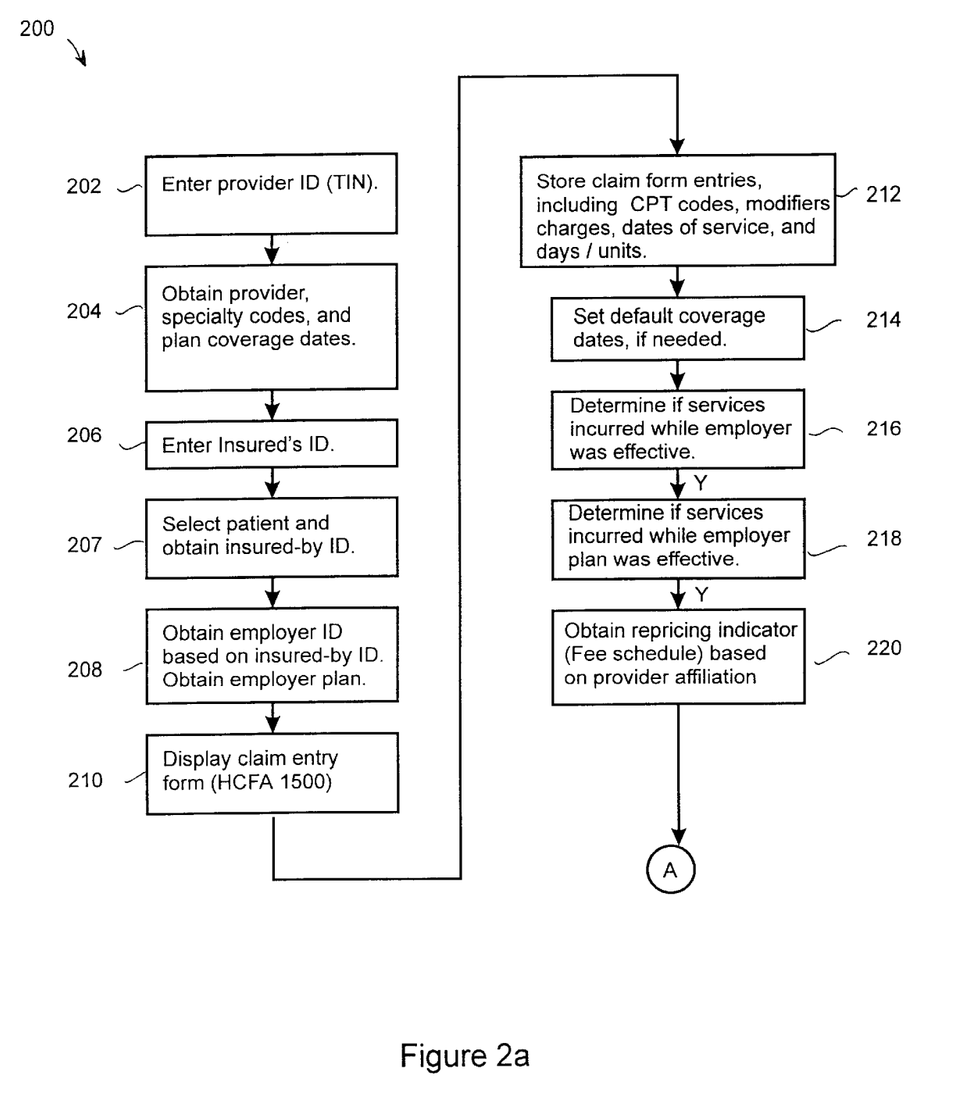
FIG. 2 shows a high level flow diagram of the processing steps for repricing a physician claim.
Figure 2B:
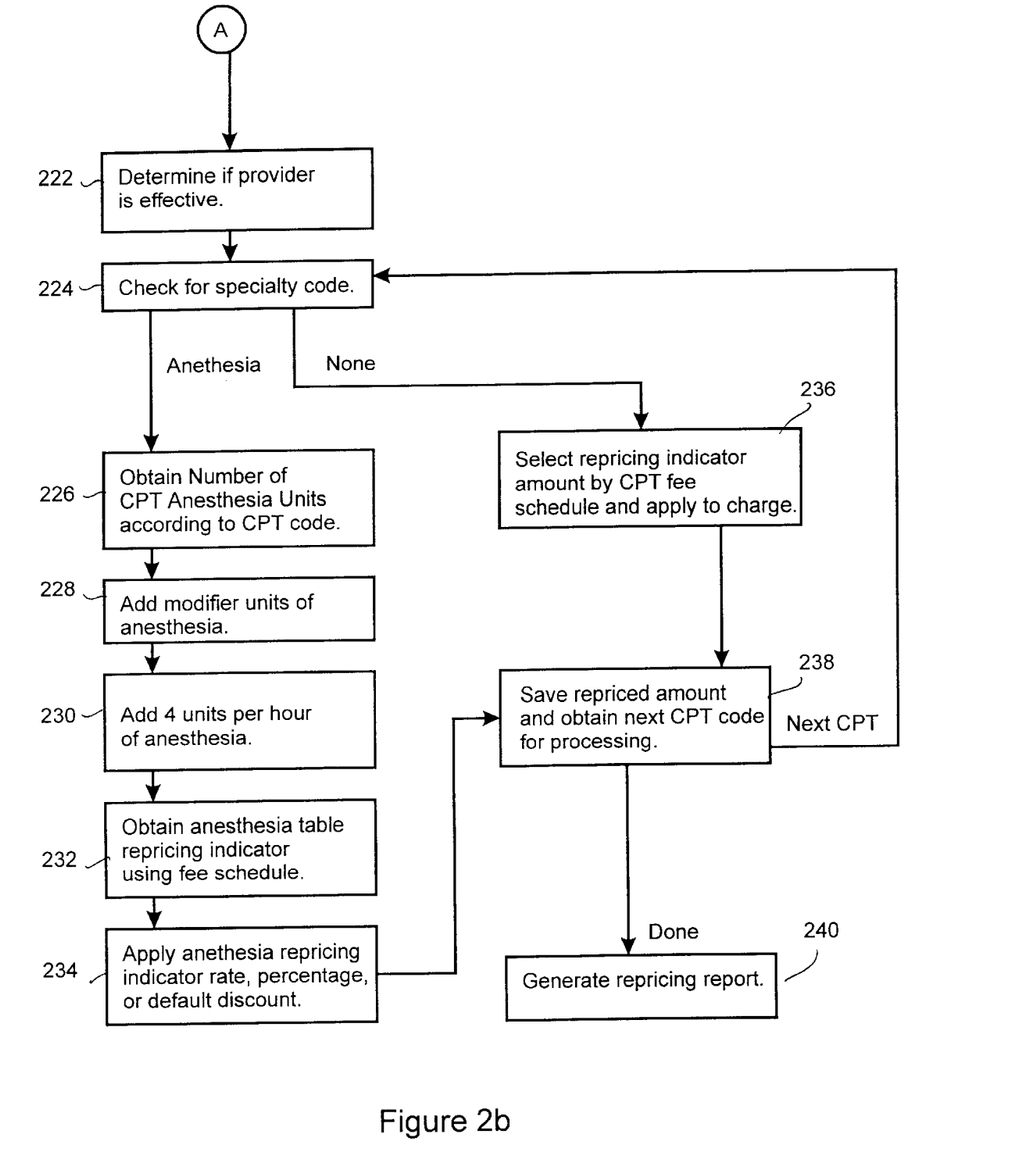

Turning to FIG. 2, that figure shows one implementation of a claim repricing process 200 for physician claims as executed by the claim repricing system. At step 202, the user enters the provider (e.g., physician) identification number.

As an example, the provider ID number may be a tax ID number. At step 204, the claim repricing system extracts information about the provider, including the provider name, specialty codes for the provider (described below), and the provider plan coverage dates from a database or database table of providers. Because a tax ID number is not necessarily unique to a particular provider, the claim repricing system may retrieve multiple records from the provider database (including physician name and practice location), display the records, and allow a user to select the appropriate provider and location.

Continuing at step 206, the user enters a patient ID number (e.g., a social security number) that is typically the ID number of the actual insured. The claim repricing system may then display, after indexing a pre-established database table, the family members corresponding to the insured's ID. The family member who incurred the charges may then be selected, at step 207, from the displayed list. In addition, the claim repricing allows the user to add new family members (or other individuals covered by the insured), if necessary, by displaying an information entry form for the user to complete, and storing the information for future reference in the appropriate database table.

Because the patient may not be, in fact, the actual insured, the claim repricing system retrieves an insured-by ID associated with the patient. Thus, for example, if the patient is the son of the insured, the claim repricing system may retrieve the ID of the insured mother (i.e., the insured-by ID). The insured-by ID may also be entered directly without the need for the selection process described above. Thus, for example, the insured-by ID may be entered directly from box 1a of a HCFA 1500 form.

At step 208, the claim repricing system retrieves an employer ID based on the insured-by ID. In other words, the insured's employer is determined. The employer's health care plan (for example, PPO or EPO), and the plan's coverage dates are also obtained, for example, from a database table indexed by the employer ID.

At step 210, the claim processing system displays a convenient claim entry form, and fills in data already determined (e.g., the patient and employer information). As an example, the claim entry system may display a HCFA 1500 form. The user completes the form, including CPT codes, modifiers, charges, dates of service, and the like. At step 212, the claim entry system stores the claim entries in preparation for repricing the claim.

Next, the claim repricing system preferably determines (steps 216 and 218) whether the services were incurred while the employer itself was "effective" (i.e., eligible for repricing), and whether the services were incurred while the plan itself was effective. The service date may be obtained directly from the claim form. The employer and plan effective (i.e., start) and termination dates may be retrieved from the database tables that store employer and plan information.

At step 214, default dates may be provided if none are present in the database tables. For example, the default dates may be set to ensure that a plan or employer is always effective in the absence of effective or termination dates in the database. If the employer or the plan is not effective, the claim repricing process ends without changing the claim service charges (i.e., the repriced amount is equal to the original amount for each CPT coded service).

Once the claim repricing system has determined that the plan and the employer are effective, the claim repricing system proceeds to retrieve a repricing indicator based on an affiliation of the provider (retrieved from a predefined affiliation table and indexed by provider ID). In other words, the provider affiliation determines a negotiated insurance contract for the provider at a particular location. The repricing indicator may be a single number, for example, 2540 or 4060 that selects a table of negotiated discounts for each CPT code. Alternatively, the repricing indicator may indicate a simple percentage discount (e.g., "25P") effective for one or more CPT codes.

At step 222, the claim repricing system retrieves the effective and termination dates of the provider. The service dates are compared against the provider effective and term dates to determine whether the provider was effective at the time the services were rendered. If not, the claim is not repriced. If the provider was effective, processing continues at step 224.

Specialty codes are present in certain situations to indicate that a distinct repricing process will apply to the service charge. Thus, at step 224, the claim repricing system checks the provider information for a recognized specialty code. As an example, the specialty code may be a "31" or a "32" to indicate that the provider supplied anesthesia services. Although the discussion below proceeds with reference to an anesthesia specialty code, it is noted that the present claim repricing system is not limited to anesthesia specialty processing, but may handle any other predetermined specialty codes.

If an anesthesia specialty code is recognized, processing continues at step 226. At step 226, the claim repricing system obtains a "local" number of anesthesia units based on the CPT code present in the claim for that particular service charge line item. Preferably, the claim repricing system retrieves the local number of units from a predefined table indexed by CPT code. Similarly, at step 228, the claim repricing system determines a number of "modifier" units of anesthesia to add, based on a table indexed by the modifier code present, for example, on the HCFA 1500 claim form. Finally, the repricing system adds, at step 230, 4 units of anesthesia per hour (as determined from the claim form (e.g., box G on the HCFA 1500)).

Once the total number of anesthesia units is known, the claim repricing system retrieves, at step 232, the appropriate anesthesia repricing indicator, preferably from a table storing anesthesia price per unit. The table may, for example, be indexed by the fee schedule determined in step 220. The anesthesia repricing indicator is typically a rate (e.g., a fractional discount) selected by the fee schedule. However, the fee schedule may itself indicate a straight percentage discount (e.g., a "25P" fee schedule indicates a straight 25% discount). A default discount (e.g., 10%) may be applied in all other cases. At step 234, the anesthesia repricing indicator is applied to the service charge to determine a repriced amount. In certain unusual cases, the repriced amount may be greater than the original service charge. In those cases, the claim repricing system may apply a predetermined discount to the service charge that always results in a smaller repriced amount.

A specialty code is not applicable in most cases. Thus, when the claim repricing system determines at step 224 that no specialty code is present, processing continues at step 236. At step 236, the claim repricing system selects a repricing indicator based on the fee schedule, CPT code, and current year. The repricing indicator is extracted from a table of repriced amounts arranged by CPT code and fee schedule. Thus, the claim repricing system preferably sets the service charge, as repriced, directly to the repriced amount retrieved from the table.

As noted above, the fee schedule, if other than a standard 2540, 4060, 4000, or 6000 or other predefined fee schedule (for example a "25P" fee schedule), may indicate a straight percentage discount. The percentage discount may be determined, as an example, by indexing a fee schedule control table with the fee schedule. The repriced amount may then be determined by applying the retrieved percentage discount to the original service charge.

The repriced amount may be multiplied by the number of units applied or consumed (as indicated, for example, by box G of the HCFA 1500 form, for example). Again, if the service charge, as repriced, is greater than the original service charge, a straight percentage discount may be applied (e.g., 10%). The repriced service charge is saved at step 238, and the next CPT code, if any, if processed starting again at step 224.

When the claim repricing system has finished repricing all the service charges, the claim repricing system generates a hard or soft copy repricing report at step 240 showing the repricing results for each service charge, including total savings. If the claim was not repriced for any of the reasons indicated above, the repricing report preferably indicates that no repricing occurred, and the reason.

Figure 3:
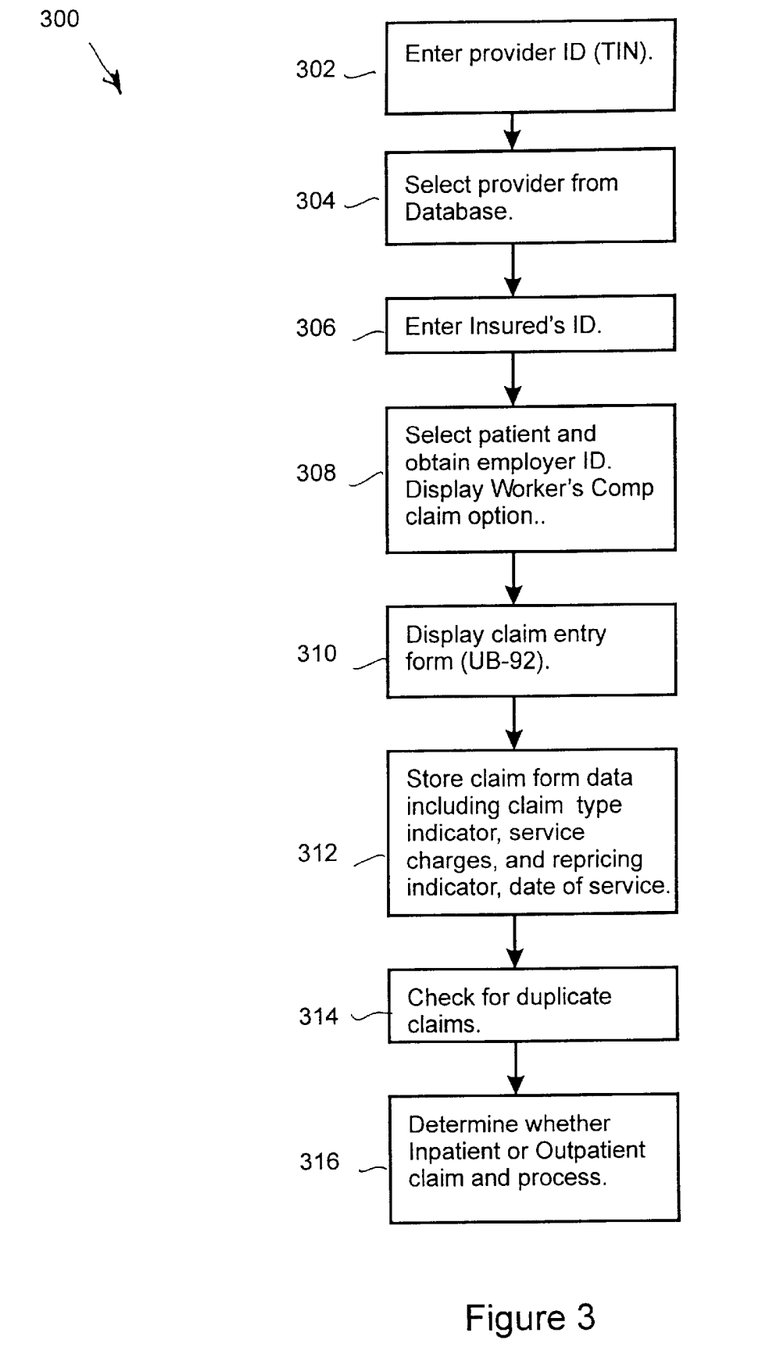
FIG. 3 illustrates a flow diagram of the initial processing steps for repricing a hospital claim.

With regard to hospital claims, the claim repricing system initiates processing according to the high level processing flow 300 shown in FIG. 3. At step 302, the user enters the provider ID (which as noted above may be, for example, a tax ID). The claim repricing system retrieves matching providers from a database table, and displays the matches for selection by the user at step 304. The claim repricing system accepts the insured's ID at step 306. The actual patient is selected along with the insured's employer ID at step 308. The repricing is system then displays an appropriate claim entry form for hospital claims (e.g., a UB-92) at step 310. The user enters the claim information into the form, and the repricing system stores the claim information at step 312.

Optionally, at step 314, the claim repricing system determines if the present claim has already been processed. This may be accomplished, for example, by searching a database of repriced (completed) claims for the same patient name, provider, service date, service charges, and service units. A duplicate claim is not repriced, while new claims continue processing at step 316 where the claim repricing system determines whether the claim is an inpatient claim or an outpatient claim.

Typically, the type of claim is determined by an entry on the claim form. As an example, the entry in box 4 of the UB-92 distinguishes between inpatient and outpatient claims. When the three digit number in box 4 has a "1" as its second digit, the claim is an inpatient claim. Otherwise, the claim is an outpatient claim.

Figure 4A:
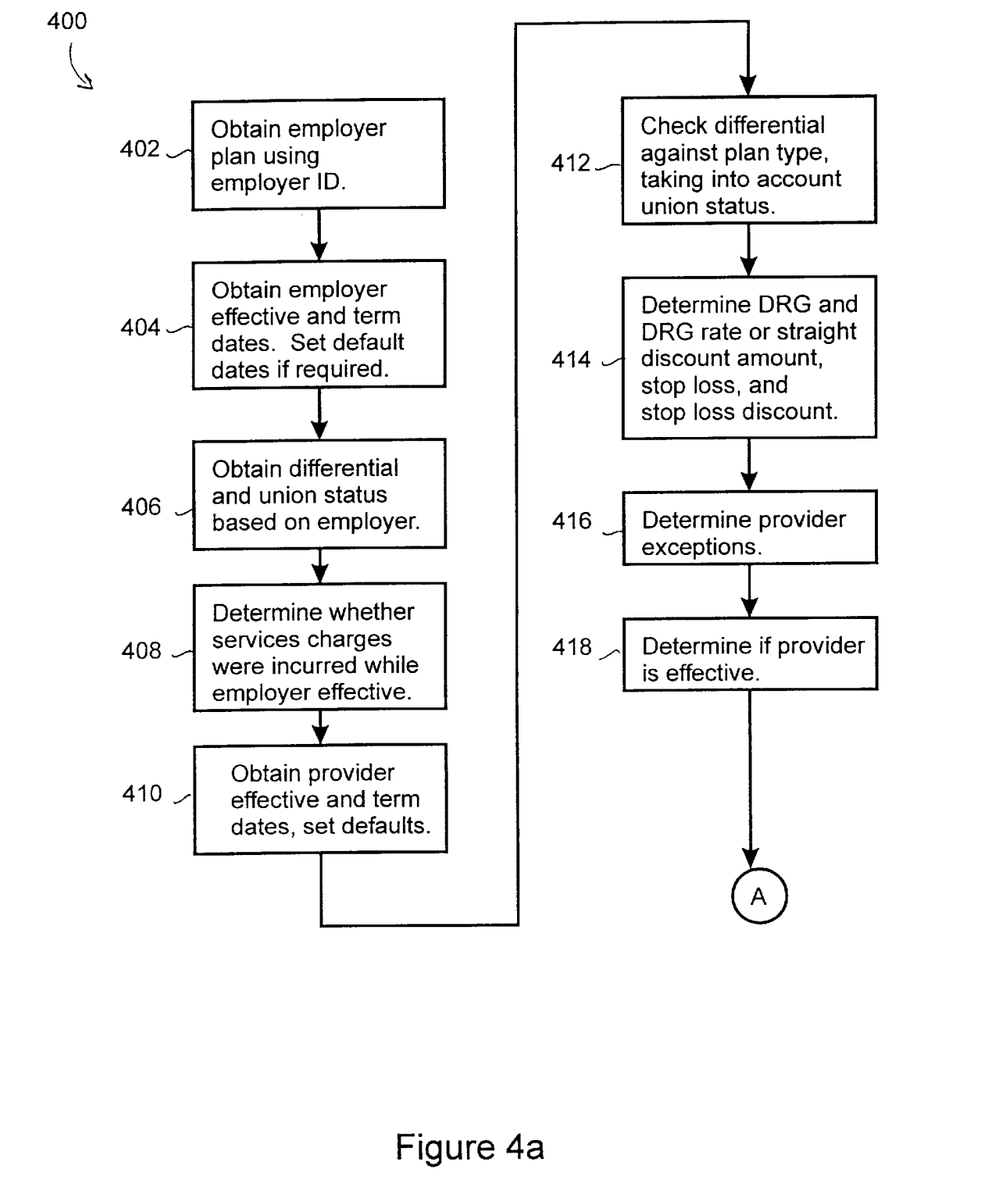
FIG. 4 depicts a high level flow diagram of the processing steps for repricing an inpatient claim.
Figure 4B:
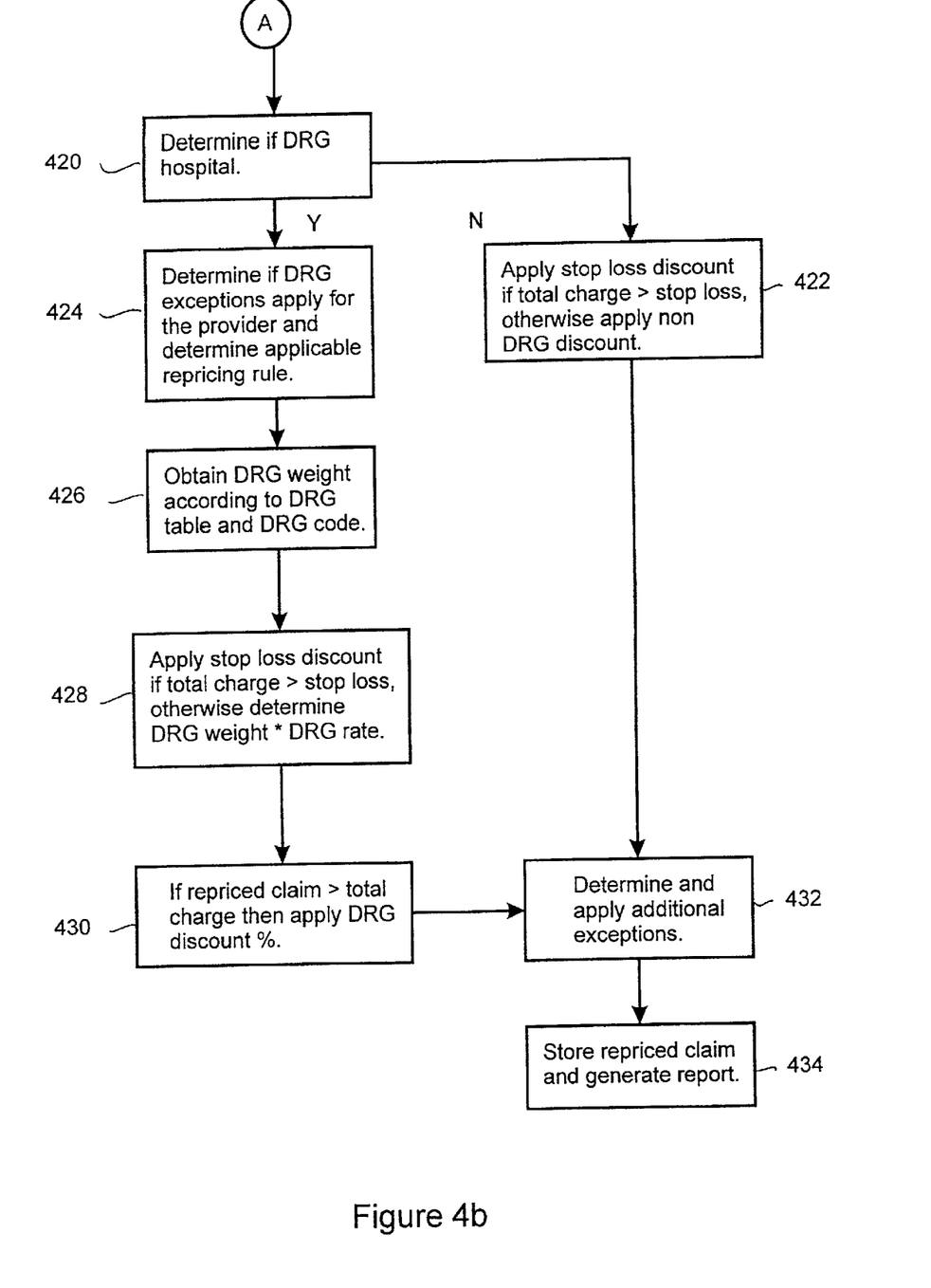

The claim processing system reprices inpatient claims according to the high level flow diagram 400 shown in FIG. 4. As will be explained in more detail below, the claim repricing system preferably reprices only the total service charge amount from the inpatient claim form. At the initial step 402, the claim repricing system obtains the employer plan according to the employer ID. The plan may be, for example, an EPO, PPO, Standard, or other plan. Effective and termination dates for the employer, or appropriate defaults, are obtained at step 404. In addition, a "differential" and a union status (explained in more detail below) are determined at step 406 for EPO and PPO plans by indexing a predefined database table according to the employer ID.

Next, the claim repricing system determines at step 408 whether the patient incurred the services while the employer was effective. If not, the claim is not repriced. Otherwise, processing continues at step 410, where the claim repricing system determines the effective and termination dates for the provider, and sets default dates, if necessary. At step 412, the claim repricing system determines whether the services qualify under the insurance plan, based on union status, differential, and DRG status of the provider.

The differential is an indicator of the level or quality of providers at which the patient may obtain covered services. A higher differential allows covered access to more providers. Union members may have a separate set of qualifying differentials and therefore separate union differentials are retrieved and compared when the employer information indicates union affiliation.

In general, the differential is compared to the provider differential for EPO plans first. If the plan differential is greater than the EPO differential, then the patient may obtain covered services at the provider under the EPO plan. Otherwise, if the plan differential is greater than the PPO differential, then the patient may obtain covered services at the provider under the PPO plan. If neither of these conditions are true, the patient may sill obtain coverage if the provider is a Diagnostic Related Groups (DRG) provider or has negotiated a straight discount (explained in more detail below). Otherwise, the plan's differential does not qualify for coverage at the particular provider, and the claim is not repriced.

Next, at step 414, the DRG rates, discounts, stop losses and stop loss amount are determined according to plan type. As an example, for the EPO plan and DRG hospital, the DRG rate, a default discount, a stop loss, and a stop loss discount are extracted from the provider database table EPO fields. If the provider is not a DRG hospital, a straight discount percentage (the non-DRG discount) is extracted from the provider database table. Whether or not the provider requires exception processing (explained below) is determined at step 416 by checking a flag in the provider database table. Before repricing begins, however, the claim repricing system determines whether the provider is effective (step 418) based on the dates extracted in step 410.

At step 420, the claim repricing system determines whether the provider is a DRG provider. If not, processing continues at step 422. For a non-DRG hospital, the claim repricing system first determines whether the total service charge is greater than the stop loss. If so, the stop loss discount is applied to the total charge, otherwise the non-DRG discount is applied to the total service charge.

If the provider is, in fact, a DRG provider, processing continues from step 420 to step 424. As noted above, a flag in the provider database table may be used to indicate exception processing for the provider. If the flag is set, the repricing system determines which exception applies by checking predefined exception tables based on DRG code (e.g., box 78 of the UB-92 form). For example, if the DRG code is a 103, 302, 424–437, 470, or 480–418, the claim repricing system may determine whether Exception 1 is active by indexing an exception table with the exception number.

Assuming that the exception is active (as indicated in the exception table) repricing code tailored to the particular exception executes. For example, for Exception 1, claims with the DRG numbers listed above may be given a straight 30% discount. Note, however, that the stop loss is typically first checked and then stop loss discount applied, if necessary, as described above.

When there is no exception, the claim repricing system, at step 426, determines a DRG weight for the DRG code by indexing a predefined table of weights by the DRG code. Repricing occurs at steps 428 and 430. First, at step 428, the repricing system determines if the stop loss has been exceeded. If so, the repriced amount is determined by applying the stop loss discount to the total service charge. Otherwise, the repriced amount (the weight times the rate) is determined. If the repriced amount exceeds the total original charge (step 430), then the DRG discount (typically a set percentage) is applied to the total service charge to generate the repriced amount. The DRG discount, however, may be set to 100% (i.e., no discount), if desired.

At step 432, the claim repricing system determines whether any additional exceptions apply that are processed after repricing the total service charge. Thus, for example, an Exception 8 may be defined that dictates that the repriced amount will never be less than 65% of the total service charge. A particular exception may provide rules that apply both during and after repricing the total service charge.

Finally, at step 434, the claim repricing system generates a report showing the repriced claim (or a reason why the claim could not be repriced). The claim repricing system generally stores the repriced claim in a database for future analysis.

As noted above, hospital claims are generally classified as inpatient or outpatient claims. The claim processing system reprices outpatient claims according to the high level flow diagram 500 shown in FIG. 5. As will be explained in more detail below, and unlike the inpatient claim, the claim repricing system typically reprices each line item service charge in an outpatient claim individually.

Figure 5A:
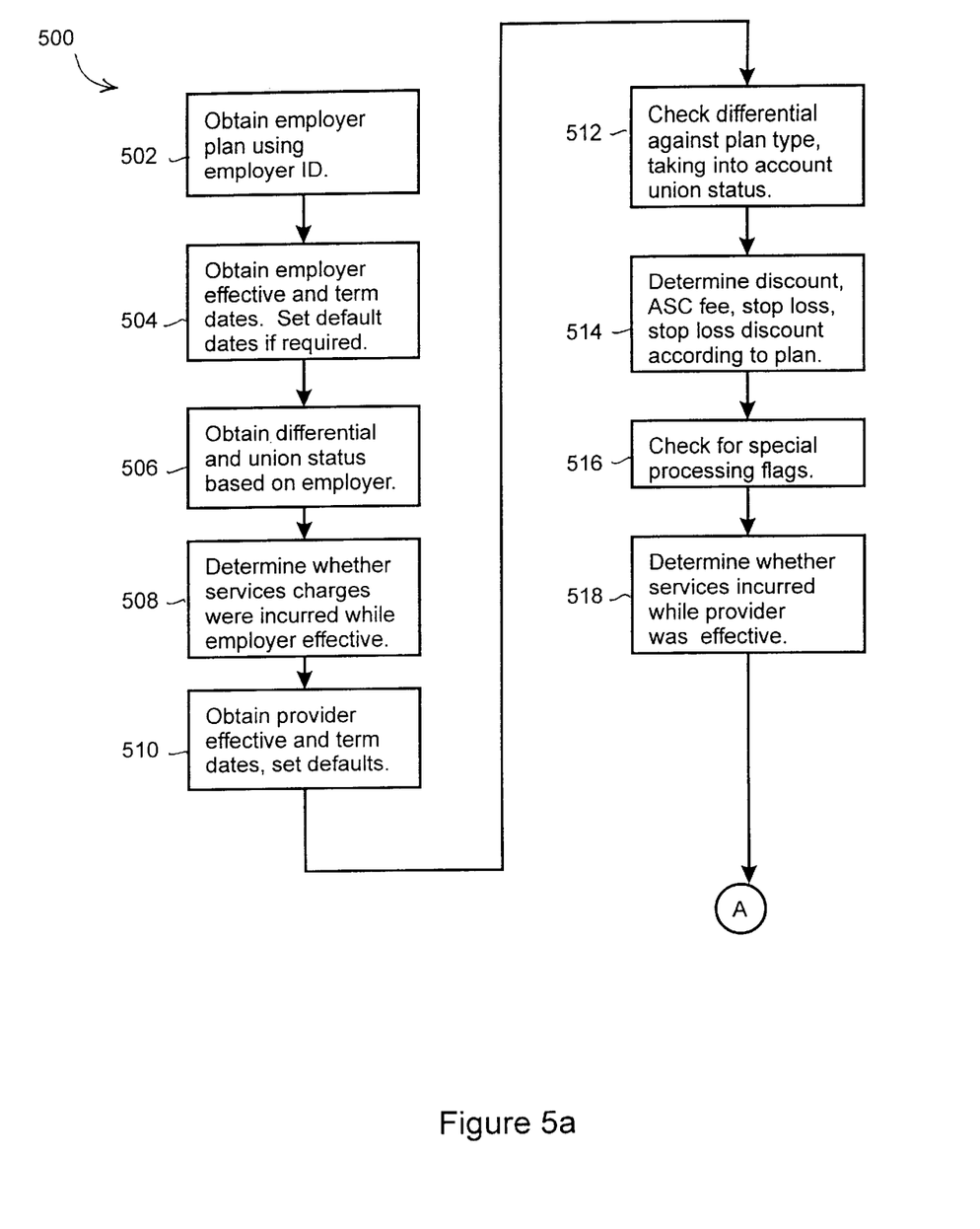
FIG. 5 depicts a high level flow diagram of the processing steps for repricing an outpatient claim.
Figure 5B:
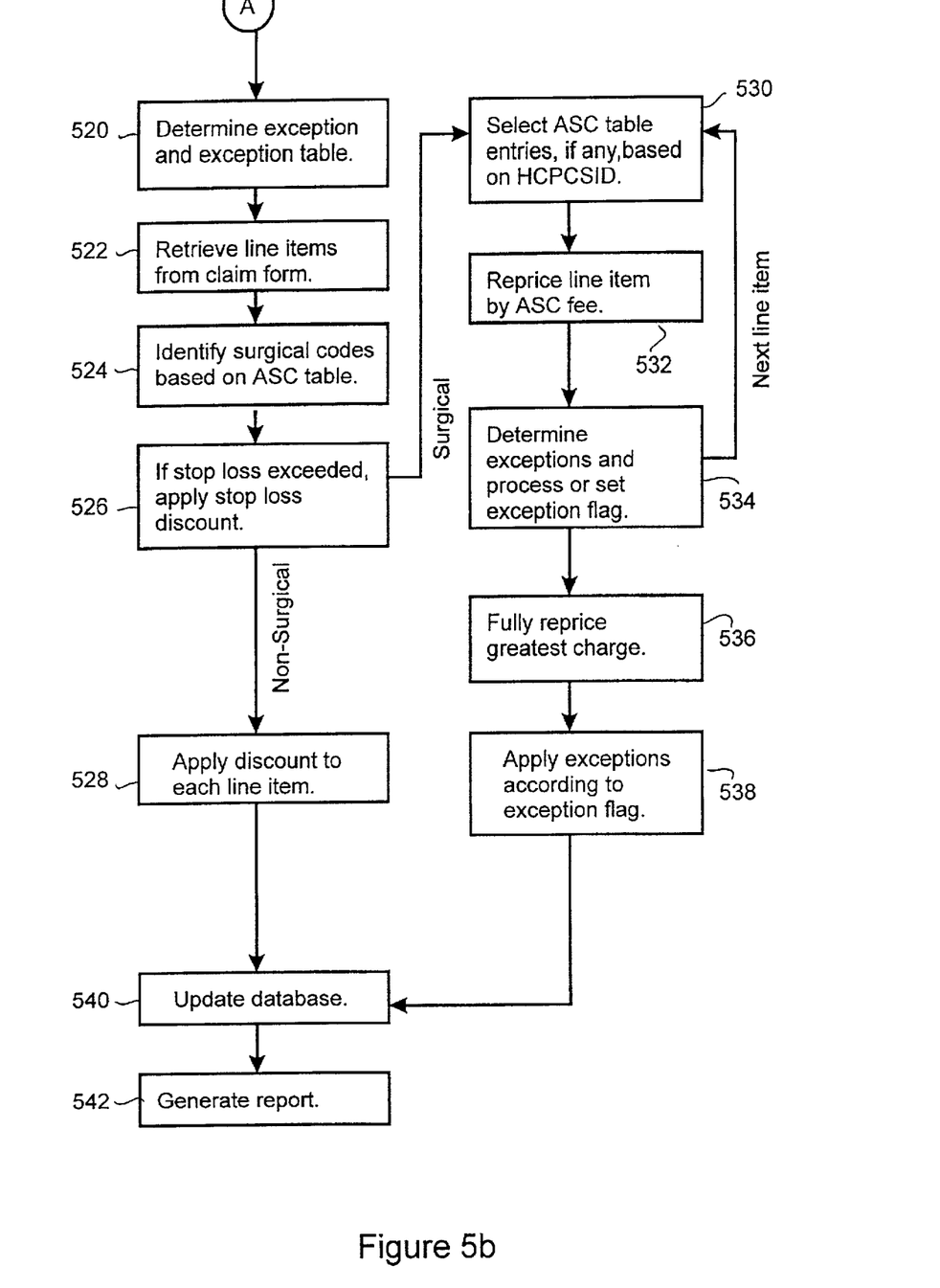

With reference to FIG. 5, the outpatient processing steps 502–512 generally perform the same functions as the inpatient processing steps 402–412. Thus, when the claim repricing system reaches step 512, the repricing system has, for example, determined whether the employer was effective when the services were incurred, determined the differential and union status associated with the employer plan, and stored the outpatient claim entries for processing.

At step 514, the claim repricing system determines the discount, Ambulatory Surgical Code (ASC) fee indicator, stop loss, and stop loss discount for the employer's plan. If certain repricing situations absolutely require human intervention, then the database table may store a special value (e.g., "SCH"). At step 516, any special values detected preferably terminate repricing and result in a report that displays an appropriate informational message. Otherwise, the claim repricing system determines whether the services were incurred while the provider was effective, and if so, continues to step 520.

In a similar fashion as the inpatient claim, the claim repricing system determines whether the provider is subject to exception codes (step 520). If so, a flag is set, and the name of the exception table is determined (e.g., by adding the provider number to a predefined prefix) for future reference. Processing continues at step 522 where the database table storing the claim line items is opened. At step 524, each HCPCSID code (i.e., box 44 on the UB-92) associated with each line item is checked against an established set of ASC codes to determine if the line item represents a surgical procedure.

Preferably, if even a single HCPCSID code is surgical, the entire claim is repriced as a surgical claim. First, however, if the total charges exceed the stop loss, a predetermined stop loss discount (which may range from 0–100%) is applied to the total charges to generate a repriced amount (step 526). The repricing process is then complete and the claim repricing system may save the results in a database and generating the report.

For non-surgical claims, processing continues at step 528, where the discount determined in step 514 is applied to each line item to generate repriced line items and a resultant repriced claim. For surgical claims, however, processing continues at step 530.

At step 530, the claim repricing system selects ASC table entries, if any apply, based on the HCPCSID code for a particular line item. Next, at step 532, the claim repricing system replaces the service charge with the repriced charge stored in the ASC table (indexed by the ASC fee determined in step 514). The repriced charge may be divided by 2 in preparation for repricing fully only the greatest line item (described in more detail below). If no table entries match the HCPCSID code, the service charge is preferably repriced to zero.

Processing continues at step 534, where any applicable exceptions are determined and processed. For example, a predefined ASC exception table may be queried according to the Revenue Code (i.e., box 42 on the UB-92) to determine if the service charge is one that is not eligible for repricing. If the service charge is not eligible for repricing, the repriced amount is reset to the original charge amount.

As another example, a predefined exception table (e.g., Exception36) may be queried to select entries corresponding to the HCPCSID code in the line item being processed. If any entries are found, the exception table determined in step 520 may then be queried to determine if any entries correspond to exception 36. If so, a predefined exception 36 repricing rule may be applied. For example, exception 36 may dictate that the repriced amount is specified by the exception table 36 itself.

Other exceptions may require application near the end of the claim repricing process. Those exceptions may be flagged in step 534 (e.g., an Exception 8 flag may be set to True) for subsequent processing. Processing then loops back to step 530 to reprice the next line item, if any more remain to be processed. When all line items have been processed, the claim repricing system continues at step 536.

At step 536, the claim repricing system fully reprices the greatest service charge. With reference back to step 532, the service charge reprice amounts were preferably divided by 2. In step 536, the claim repricing system multiplies the largest valid repriced amount by 2, thereby fully repricing that service charge.

Continuing to step 538, the exception flags are checked to determine final exception processing. As an example, if the total repriced amount is greater than the total original amount (i.e., the sum of all the line item service charges), then if the Exception 8 flag is True, each line item may be repriced according to a special rule. For example, under Exception 8, each line item may be repriced using a straight 35% discount.

After the final exceptions are checked, the claim repricing system, at step 540, stores the repriced claim in a database. At step 542, the claim repricing system generates a report, showing, for example, the claim number, employer name, payor, patient name and ID, provider TIN, bill type, admit date, and each service charge as billed and as repriced, the associated savings, and the total savings over all line items.

The microfiche appendix provides one exemplary implementation of an automated claim repricing system, including program code, database table definitions, and operational screenshots.

Figure 6:
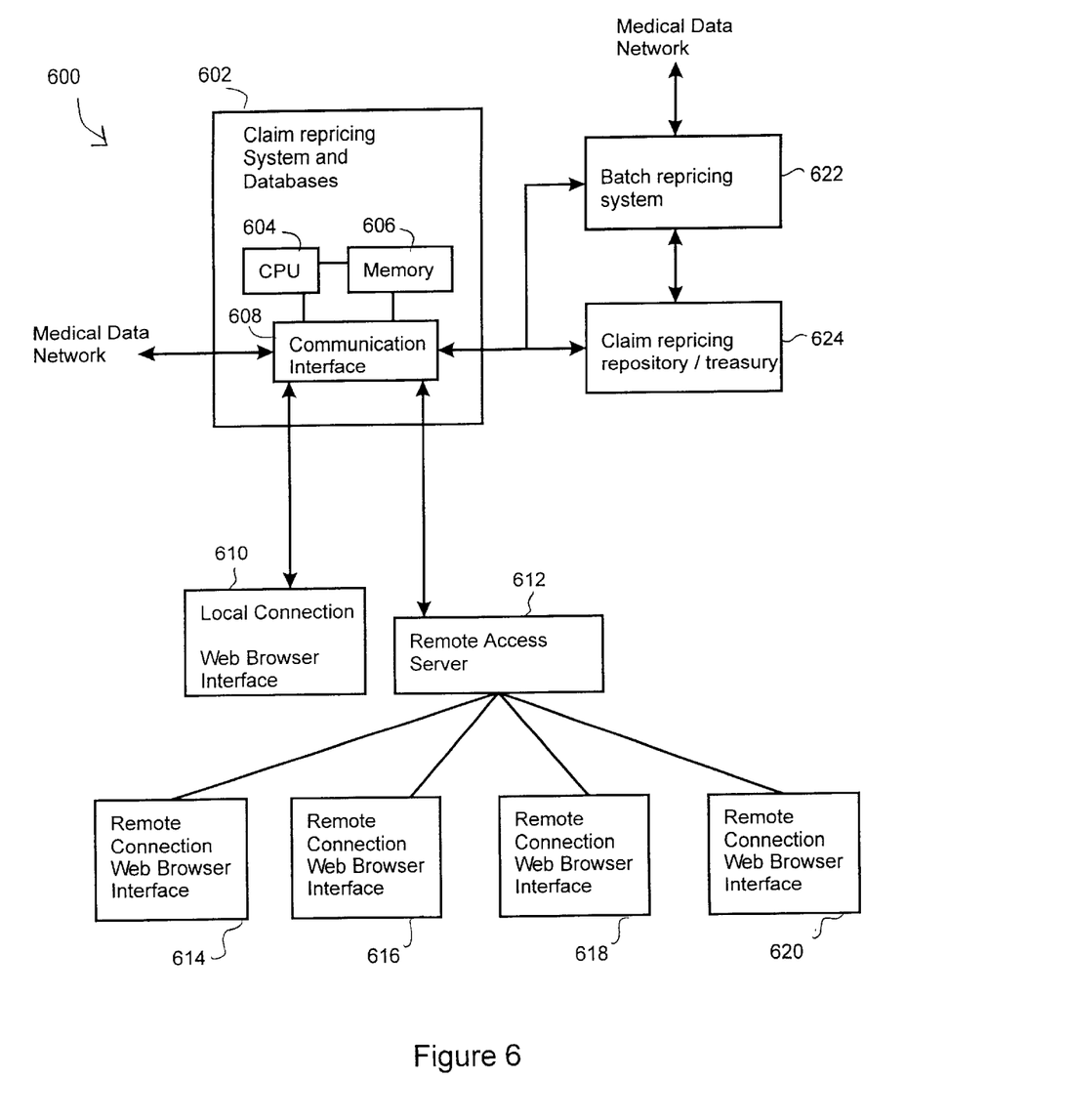
FIG. 6 shows an example of a cooperative claim repricing network.

Turning next to FIG. 6, that figure illustrates a system diagram 600 of the hardware and software elements that may be used in a cooperative claim repricing network. The system diagram 600 includes a claim repricing system 602 comprising a CPU 604, a memory 606, a communication interface 608, as well as repricing software and associated databases. A local machine 610 is connected, preferably through a web browser interface, on-site with the claim repricing system 602. Also shown is a Remote Access Server (RAS) 612 that allows secure remote logins from the remote machines 614–620. An automated batch repricing system 622 and a claim repository/treasury database 624 are also present.

In general, the claim repricing system 602 operates according to the logic explained above to reprice insurance claims. The claim repricing system 602 may reprice claims submitted from the local machine 610, the remote machines 614–620, or the batch repricing system 622. In addition, the claim repricing system 602, or the batch repricing system 622 may be connected to any established medical data network (e.g., a Kinetra™) network, through which claims may be received, repriced, and transmitted completely electronically.

Each repriced claim, and any other associated medical information (for example, additional data received with the claim over the medical data network) is preferably saved in the claim repository database 624.

Figure 7:
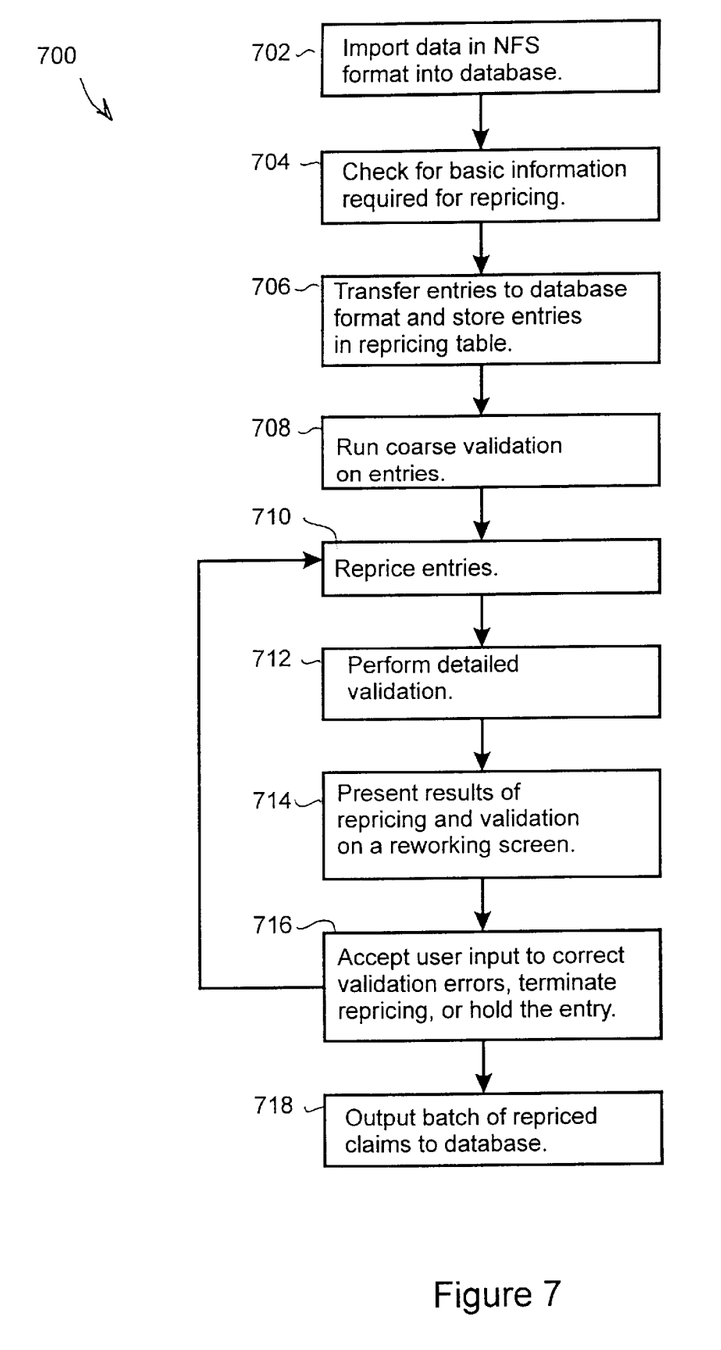
FIG. 7 illustrates a high level flow diagram of the processing steps in a batch claim processing system.

Turning now to FIG. 7, that figure illustrates a high level flow diagram of a batch claim repricing system 700. The batch claim repricing system 700 may be used to reprice claims at high speed without human intervention (although in the presence of claim form errors, the claim reworking process may accept user input as noted below). At step 702, the batch repricing system imports claims, preferably in standard NFS format, into a holding database. At step 704, the batch repricing system checks each claim for the presence of basic information required to reprice a claim. For example, if portions a claim are completely missing, the batch repricing system may, instead or repricing the claim, present the claim to a user at a reworking screen (as described below).

The claims that pass the basic information check are then stored in a repricing table at step 706. A coarse validation procedure executes at step 708 to determine whether important repricing information is present in the claim. For example, when the provider ID is missing, the coarse validation procedure may present the claim on the reworking screen rather than attempting to reprice the claim.

At step 710, the batch repricing system reprices the claim entries in the repricing table. The repricing logic described above and provided in the microfiche appendix may be used to reprice physician, inpatient, and outpatient types of claims. At step 712 a detailed validation procedure executes. Beyond the coarse validation procedure (step 708) which may determine whether a provider ID is present, for example, the detailed validation procedure determines whether a provider ID is valid or recognized by the batch repricing system. Claims that do not pass the validation procedure in step 712 are presented on a reworking screen at step 714.

At the reworking screen, a user may correct claim entries that did not pass validation and resubmit the claim for repricing. Alternatively, the user may elect to hold the claim (i.e., not correct and not reprice the claim), or terminate repricing for all invalid claims altogether. The batch repricing system accepts the reworking input at step 716, and appropriately reprices the claim, holds the claim, or terminates claim repricing. Finally, at step 718, the batch repricing system stores the repriced claim into a claim repository (e.g., the claim repository 624) for future reference.

The batch repricing system runs at a speed limited only be the speed of the computer hardware upon which it executes. Thus, in contrast to past manual repricing techniques that may only reprice 125 claims per week or less, the batch repricing process 700, using the repricing logic described above, may reprice multiple claims per second. The microfiche appendix includes an exemplary implementation of a batch repricing system, including the program code, database field definitions.

Thus, the present invention provides a claim repricing system that accurately, quickly, and reliable reprices insurance claims. The hardware/software nature of the repricing system allows processing exceptions to be added, modified, and expanded without having to retrain claim repricing personnel. In addition, the present claim repricing system provides a mechanism for batch repricing large numbers of claim extremely quickly, for identifying invalid claim data, and for providing a user friendly interface for reworking those claims.

While particular elements, embodiments and applications of the present invention have been shown and described, it is understood that the invention is not limited thereto since modifications may be made by those skilled in the art, particularly in light of the foregoing teaching and explanation. It is therefore contemplated by the appended claims to cover such modifications and incorporate those features which come within the spirit and scope of the invention.

What is claimed is:

1. A claim processing system for repricing insurance claims, the system comprising:
   a processor; and
   a memory coupled to the processor, the memory encoded with:
      instructions for storing service charges identified by at least one uniform code;
      instructions for identifying a physician from a database of physicians according to a physician ID;
      instructions for identifying a patient from a database of patients;
      instructions for determining an employer insurance plan providing coverage for the patient;
      instructions for determining a repricing indicator based on an affiliation of the physician and the employer insurance plan;
      instructions for performing a course validation to determine if at least one of information for identifying a physician, identifying a patient and identifying an employer insurance plan is present;
      instructions for repricing the service charges according to the repricing indicator to generate repriced service charges; and
      instructions for performing a detailed validation to determine if at least said repriced service charges are valid.

2. The claim processing system of claim 1, wherein the repricing indicator is a fee schedule comprising individual repricing amounts associated with CPT codes.

3. The claim processing system of claim 1, wherein the repricing indicator is a percentage discount.

4. The claim processing system of claim 1, wherein the computer readable memory further comprises instructions for generating a repricing report showing each of the repriced service charges.

5. The claim processing system of claim 1, wherein the computer readable memory further comprises instructions for determining availability of insurance plan coverage to the patient based on an effective date of the employer insurance plan.

6. The claim processing system of claim 1, wherein the computer readable memory further comprises instructions for determining the availability of the physician based on an effective provider date.

7. The claim processing system of claim 1, wherein the computer readable memory further comprises instructions for determining the presence of a specialty repricing code.

8. The claim processing system of claim 7, wherein the specialty repricing code is an anesthesia code.

9. The claim processing system of claim 8, wherein the computer readable memory further comprises instructions for determining a total number of anesthesia units and for determining an anesthesia repricing indicator.

10. The claim processing system of claim 9, wherein the instructions for determining a total number of anesthesia units includes instructions for determining a number of anesthesia modifier units.

11. The claim processing system of claim 9, wherein the anesthesia repricing indicator is a percentage discount.

12. The claim processing system of claim 9, wherein the anesthesia repricing indicator is a rate.

13. A claim processing system for repricing insurance claims, the claim processing system comprising:
   a processor; and
   a memory coupled to the processor, the memory encoded with:
      instructions for identifying a provider from a database of providers according to a provider ID;
      instructions for identifying a patient from a database of patients;
      instructions for identifying an employer based on an insured-by ID associated with the patient;
      instructions for identifying a weight and a rate based on the employer and the provider;
      instructions for performing a course validation to determine if at least one of information for identifying a provider, identifying a patient and identifying an employer is present;
      instructions for repricing a total service charge based on the weight and the rate to generate a repriced claim amount; and
      instructions for performing a detailed validation to determine if at least said repriced claim amount is valid.

14. The claim processing system of claim 13, wherein the weight is a Diagnostic Related Group (DRG) weight and the rate is a DRG rate.

15. The claim processing system of claim 13, wherein the computer readable memory further comprises instructions for determining whether the provider was effective at a predetermined date.

16. The claim processing system of claim 15, wherein the computer readable memory further comprises instructions for determining whether the employer was effective at a predetermined date.

17. The claim processing system of claim 13, wherein the computer readable memory further comprises instructions for identifying a stop loss and a stop loss discount based on the provider, and instructions for applying the stop loss discount to the total service charge when the total service charge is greater than the stop loss.

18. The claim processing system of claim 13, wherein the computer readable memory further comprises instructions for applying a DRG discount to the total service charge when the repriced claim amount is greater than the total service charge.

19. The claim processing system of claim 13, wherein the computer readable memory further comprises instructions for identifying an insurance plan carried by the employer and for determining a differential and a union status according to the insurance plan.

20. The claim processing system of claim 19, wherein the computer readable memory further comprises instructions for terminating repricing when the differential and the union status do not qualify the patient for coverage at the provider.

21. The claim processing system of claim 13, wherein the computer readable memory further comprises instructions for determining a claim repricing exception associated with the provider.

22. The claim processing system of claim 21, further comprising instructions for applying a repricing rule determined by the claim repricing exception.

23. A claim processing system for repricing insurance claims, the claim processing system comprising:
   a processor; and
   a memory coupled to the processor, the memory encoded with:
      instructions for determining what type of claim to reprice from a plurality of claims recognized by the claim processing system;
      instructions for identifying a provider from a database of providers according to a provider ID;
      instructions for identifying a patient from a database of patients;
      instructions for identifying an employer and an employer insurance plan associated with the patient;
      instructions for storing a claim comprising at least one line item service charge;
      surgical repricing instructions for repricing the claim when a line item is a surgical line item;
      instructions for performing a course validation to determine if at least one of information for identifying a provider, identifying a patient, identifying an employer and identifying an employer insurance plan is present;
      non-surgical repricing instructions for repricing individual line items when no line item is a surgical line item; and
      instructions for performing a detailed validation to determine if at least one of a repriced claim and a repriced individual line item is valid.

24. The claim processing system of claim 23, further comprising instructions for determining a stop loss and a stop loss discount and applying the stop loss discount to a total service charge when the total service charge exceeds the stop loss.

25. The claim processing system of claim 23, further comprising instructions for determining a discount associated with the employer insurance plan, and wherein the non-surgical repricing instructions comprise instructions for applying the discount to the line items to generate repriced line items.

26. The claim processing system of claim 23, further comprising instructions for determining whether the provider was effective at a predetermined date.

27. The claim processing system of claim 26, further comprising instructions for determining whether the employer was effective at a predetermined date.

28. The claim processing system of claim 23, further comprising instructions for determining a differential and a union status according to the insurance plan.

29. The claim processing system of claim 28, further comprising instructions for terminating repricing when the differential and the union status do not qualify the patient for coverage at the provider.

30. The claim repricing system of claim 23, wherein the surgical repricing instructions comprise instructions for determining a repricing indicator based on each line item and instructions for repricing each line item according to the repricing indicator.

31. The claim processing system of claim 30, wherein the repricing indicator is a dollar amount based on an Ambulatory Surgical Code table.

32. The claim processing system of claim 30, further comprising instructions for determining a repricing exception and for applying an exception repricing rule determined by the repricing exception to a line item.

33. The claim processing system of claim 32, wherein the exception repricing rule is applied after repricing each line item.

* * * * *